C. C. ALLEN.
POLISHING TOOL FOR OPHTHALMIC LENSES.
APPLICATION FILED JULY 6, 1917. RENEWED MAR. 18, 1920.
1,356,330. Patented Oct. 19, 1920.
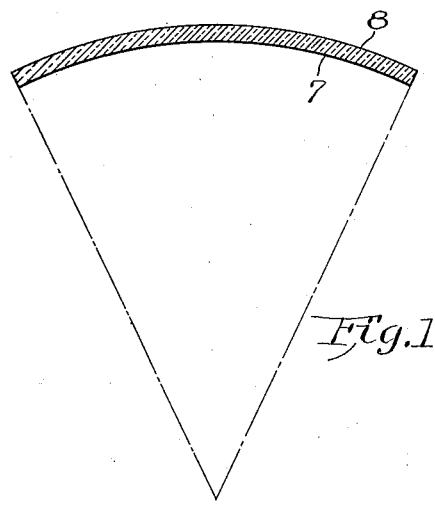
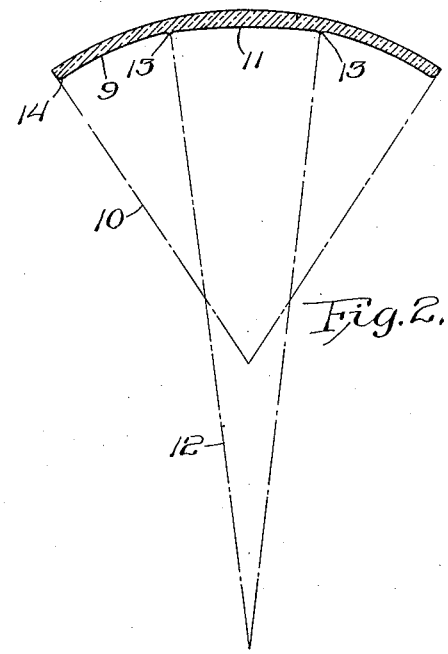
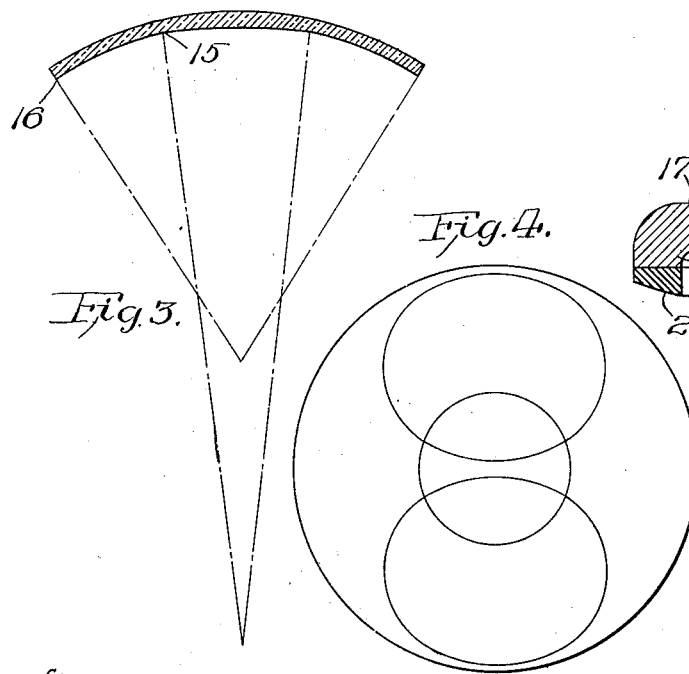
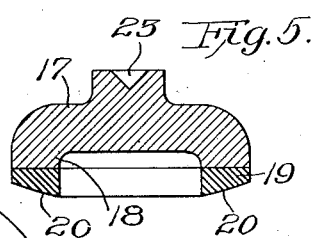
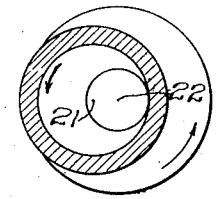

UNITED STATES PATENT OFFICE.

CLILE C. ALLEN, OF CHICAGO, ILLINOIS.

POLISHING-TOOL FOR OPHTHALMIC LENSES.

1,356,330.  Specification of Letters Patent.  Patented Oct. 19, 1920.

Application filed July 6, 1917, Serial No. 178,977. Renewed March 18, 1920. Serial No. 366,966.

*To all whom it may concern:*

Be it known that I, CLILE C. ALLEN, a citizen of the United States, residing at Chicago, county of Cook, and State of Illinois, have invented certain new and useful Improvements in Polishing-Tools for Ophthalmic Lenses, of which the following is a specification.

The present invention has to do with certain improvements in tools for polishing ophthalmic bi-focal lenses and the like. The features of the present invention have particular reference to tools used for polishing ophthalmic bi-focal lenses of the type wherein the distant and reading fields are spherically ground to different radii of curvature upon the same side of the lens crystal, and wherein the curvature of either field will, if continued, enter into and lie below the surface of the adjacent field.

Ophthalmic lenses may be divided into two classes for the purpose of clearness, the single vision lens whose entire area is of proper dioptric power to correct the refractive error of the patient for a certain desired distance, and the bi-focal lens whose area is divided into two areas of different dioptric power, the upper, or distant field for the viewing of distant objects, and the lower, or reading field for viewing near objects, such as reading, etc.

In the manufacture of single vision or of bi-focal ophthalmic lenses, it is usual to first grind the lens surface upon a metal lap of iron, steel, bronze, or the like, of the required curvature, an abrasive of succeeding degrees of fineness being applied between said lap and said lens surface until said lens surface has attained the proper degree of smoothness or fineness for the ensuing polishing process. By reason of the rigid and inelastic properties of said metal laps it is well known that no difficulty is encountered in the grinding of lens surface to an exact radius of curvature over the entire lens area, or partial lens area, as desired.

Great difficulty is encountered, however, in maintaining this exact radius of curvature over the entire area or areas of said ground lens surfaces during the subsequent polishing process, and in order that the features of the present invention may be more readily understood and appreciated by those skilled in the art, I will first explain briefly the method or process which has heretofore been practised, and in a general way the deficiencies experienced by reason of the use of the said method. Two general classes of polishing tool have been heretofore used for the polishing of ophthalmic lenses. One of these may be called the fabric or cloth tool. It consists primarily in the use of a layer of cloth, felt, or the like on the surface of a block of metal, the surface of said fabric being formed on a curvature or contour corresponding to the curvature or contour of the lens surface to be polished.

After applying to the surface a suitable polishing agent, such as the oxids of iron, tin, or lead, frictional movement may be caused between the polishing tool and the lens surface to produce the necessary cutting or polishing action.

The other class of polishing tool is a so-called "hard" polishing tool, and is employed when a polished lens surface of greater accuracy than can be attained by the use of the fabric tool is required. This hard polishing tool consists of a block of metal or the like upon which is a facing of resin, pitch, wax, or the like, or a mixture of these substances, formed on a curvature corresponding to the curvature of the lens surface to be polished. It has heretofore been usual when using either of the two classes of polishing tool described, to so control the frictional movement between the polishing tool and the lens surface that a portion of the polishing tool shall extend beyond the edge of the lens surface being polished either a part of, or during the entire time required for the polishing process.

This is the case when polishing either a single vision lens, wherein the surface is of the same radius of curvature from edge to edge, or when polishing a bi-focal lens of the type known as solid bi-focals wherein the distant and reading portions are ground upon different radii of curvature and wherein the continuation, or extension, of the curvature of either field does not fall upon or come in contact with the surface of the adjoining field.

This extension or movement of the polishing tool beyond the boundary of the surface being polished cannot be utilized, however, for the polishing of the particular type of bi-focal lenses to which the present invention particularly relates for the reason that such extension or movement of the polishing tool beyond the boundary or line of joinder between the distant and reading fields will come in contact with and destroy the accuracy of the surfaces of the adjacent field.

It is essential in the present invention that the polishing tool of each of the distant or reading portions of the lens extend up to but not beyond the boundary, or line of joinder, between the said distant and reading fields, though the polishing tool may extend beyond the outer margin of the distant field if desired.

Wide experience has shown that it is practically impossible to accurately polish either field up to the line of joinder by the use of the fabric polishing tool. By reason of the elastic nature and lack of rigidity of the fabric, that portion or zone of the field being polished which lies adjacent to the line of joinder will receive a lesser polishing effect than that of the greater portion of the field being polished, and, in like manner, the outer margin or zone of the lens crystal will receive a greater polishing effect, if the polishing tool extend beyond said margin, with the result that said margin will be rounded or depressed and the resultant polished surface will not correspond to the curvature originally ground. It is essential that the polished lens surface be of the same radius of curvature up to the line of joinder, as otherwise the refractive power of one portion of the field will differ from that of another.

Experience has also shown that the hard polishing tool presents disadvantages for the polishing of the type of bi-focal lenses described for the reason that the materials so employed will "flow" by reason of lack of sufficient tensile strength and of resistance to compression. This flowing results in a change in form of the polishing surface of the tool and consequently inability of the operator to polish the lens surface with the required degree of accuracy. Furthermore, these materials will soften under the heat generated by the friction of the polishing process. It has been attempted to eliminate this softening by a spray or current of iced water, but this expedient does not remove the flow, due to lack of compressible strength, caused by pressure of the tool upon the lens surface.

In order for a polishing tool to satisfactorily perform its functions in the present art, it should have sufficient tensile strength to retain its form or contour; it should have sufficient compression strength to resist the pressure between the surfaces in frictional contact; it should have sufficient stability and strength to retain its form under the range of temperatures encountered in the polishing process. It should be softer than the surface sought to be polished so as to enable the particles of polishing material to embed themselves in the surface of the polishing tool rather than in the surface sought to be polished; and it should have a greater ability to seize upon, and retain hold of the polishing particles than the surface sought to be polished.

I have discovered the fact that ebonite provides a very efficient polishing tool for this class of work, because it conforms to all of the foregoing requirements. This consists of such materials as are capable of hard vulcanization when mixed with sulfur or its derivatives. This material possesses the necessary tensile strength, compressible strength, and non-tendency to flow under the heat generated by the friction of the polishing process to admirably adapt it for use as the facing of the polishing tool.

Such polisher tool facing works perfectly under normal polishing conditions, the polishing powder being applied to its surface from time to time, but I have further found, when a polishing powder, such as the oxids of iron, tin, or lead, is incorporated within the body of the facing, that greater compressible strength and non-tendency to flow is secured, thus permitting the shortening of the polishing time required by the application of greater pressure of the polishing tool upon the lens surface. Ebonite made of pure, hard vulcanized india rubber, either with or without a polishing powder incorporated therein, forms an excellent example of my improved polisher facing.

In the drawing:

Figure 1 shows a cross section through a crystal before the same has been either ground or polished;

Fig. 2 shows a view similar to Fig. 1, with the exception that the crystal has been ground on two radii of curvature so as to give the two fields of visions, and the crystal has also been polished by the use of a cloth polisher or the like, so that an objectionable shoulder has been formed at the line of joinder between the said fields;

Fig. 3 shows a view similar to Fig. 2, with the exception that the fields have been polished by the use of a polishing tool embodying the features of the present invention;

Fig. 4 shows a plan view of the crystal shown in Fig. 3, and shows also the manner in which the crystal may be cut so as to provide two complete bi-focal lenses;

Fig. 5 shows a cross section through a polishing tool having applied thereto a polishing surface embodying the features of the present invention; and Fig. 6 shows on reduced scale a plan view of a crystal which is being operated on by the use of an annular polishing lap.

Considering the several figures, the raw crystal is shown in Fig. 1. The particular crystal illustrated is concavo-convex having the concave surface 7 and the convex surface 8. The concave surface is first ground to present an annular distance field 9 formed on the radius 10, and a central circular reading field 11 formed on the radius 12. In case the cloth or other yieldable polishing tool be used, the objectionable shoulder 13 will be formed between the fields 9 and 11. In like manner the outer edge or periphery of the crystal will be rounded or beveled as at 14.

By the use of the features of the present invention, the shoulder 13 and the beveled edge 14 are both eliminated, so that the line of joinder 15 between the fields is without a shoulder, and the outer edge or periphery 16 of the crystal is sharp and not beveled.

A very desirable form of polishing tool is that shown in Figs. 5 and 6. This tool is annular in form, comprising a body portion 17 having the annular rim or flange 18. This rim or flange is faced with the polishing material 19 whose polishing surface 20 is formed on the exact curvature of the surface which is to be polished. This annular lap is applied to the crystal in the manner shown in Fig. 6, wherein it will be observed that the center 21 of the lap is offset or excentric with respect to the center 22 of the crystal. A central recess or depression 23 is formed in the upper surface of the lap, into which a pointed instrument or pin may be inserted for the purpose of exactly centering the lap in a desired position. By reason of the eccentricity of the lap as compared to the crystal, the rotation of the crystal in the direction of the arrow in Fig. 6 will cause the lap to rotate in the same direction, being the direction of its arrow in Fig. 6. However, as any given particle of material on the polishing surface of the lap travels around the circle of rotation of the lap, said particle of material will be caused to travel back and forth across the surface of the annular portion of the crystal, so that the same will be polished.

In like manner the central area 11 is polished on an annular lap similar to Fig. 5, the outer diameter of which is approximately two-thirds of the diameter of the area 11, and the diameter of the inner recess of which is approximately one-sixth of the diameter of the area 11.

While I have herein disclosed only a certain embodiment of the features of my invention, still I wish it to be distinctly understood that I do not limit myself to the said embodiment, except as I may do so in the claims.

For the purpose of clearness in the claims, I term the type of bi-focal lens wherein both distant and reading fields are formed upon one side of the lens crystal, and wherein the continuation of the curvature of either of the distant or reading fields will enter into the material forming the adjacent field a "bi-focal lens of abutting fields".

I claim:

1. A polishing tool for one-piece bifocal lenses comprising a ring, the polishing face of which is composed of hard rubber or ebonite and has a sharp edge for operating at the line of division between the distance and reading fields.

2. A polishing tool for one-piece bifocal lenses comprising a ring, the polishing face of which is composed of hard rubber or ebonite and has a sharp inner edge and an internal diameter substantially larger than that of the reading field of the lens blank.

CLILE C. ALLEN.